United States Patent [19]
Datta et al.

[11] Patent Number: 5,649,103
[45] Date of Patent: Jul. 15, 1997

[54] METHOD AND APPARATUS FOR MANAGING MULTIPLE SERVER REQUESTS AND COLLATING REPONSES

[75] Inventors: Utpal Datta, Bedford; Mark Wagner, Merrimack, both of N.H.

[73] Assignee: Cabletron Systems, Inc., Del.

[21] Appl. No.: 502,163

[22] Filed: Jul. 13, 1995

[51] Int. Cl.⁶ .................................................. G06F 13/00
[52] U.S. Cl. ........................................ 395/200.03; 395/610
[58] Field of Search .......................... 395/200.01, 200.03, 395/610, 684

[56] References Cited

U.S. PATENT DOCUMENTS

| | | | |
|---|---|---|---|
| 5,555,375 | 9/1996 | Sudama et al. | 395/200.03 |
| 5,592,620 | 1/1997 | Chen et al. | 395/200.01 |

FOREIGN PATENT DOCUMENTS

| | | |
|---|---|---|
| 0384339A3 | 8/1990 | European Pat. Off. . |
| 0661652A1 | 7/1995 | European Pat. Off. . |
| 6075890 | 3/1994 | Japan . |

OTHER PUBLICATIONS

Chang et al., "A Service Acquisition Mechanism For Server-Based Heterogeneous Distributed Systems," IEEE Transactions On Parallel and Distributed Systems, vol. 5, No. 2, 1 Feb. 1994, pp. 154–169.

Schill et al., "Client/Server Approach Versus Distributed Object-Oriented Computing On Top of OSF DCE", Computer Communications, Jul. 1995, UK, vol. 18, No. 7, pp. 512–518.

Singleton et al., "Data Access Within The Information Warehouse Framework," IBM Systems Journal, vol. 33, No. 2, 1 Jan. 1994, pp. 300–325.

"Early Termination Of Multicast Queries," IBM Technical Disclosure Bulletin, vol. 34, No. 7B, 1 Dec. 1991, pp. 419–420.

*Primary Examiner*—William M. Treat
*Attorney, Agent, or Firm*—Wolf, Greenfield & Sacks, P.C.

[57] ABSTRACT

In a communications network, a request manager simultaneously dispatches a number of requests to servers corresponding to at least one domain of interest that is specified by a client. Multiple responses are received and a single collated response is sent back to the client that initiated the request. A request context table is provided which includes an anchor context and dependent contexts corresponding to each of the servers, and a session count for tracking receipt of all responses for each server. An internal cache of server addresses is also maintained.

18 Claims, 4 Drawing Sheets

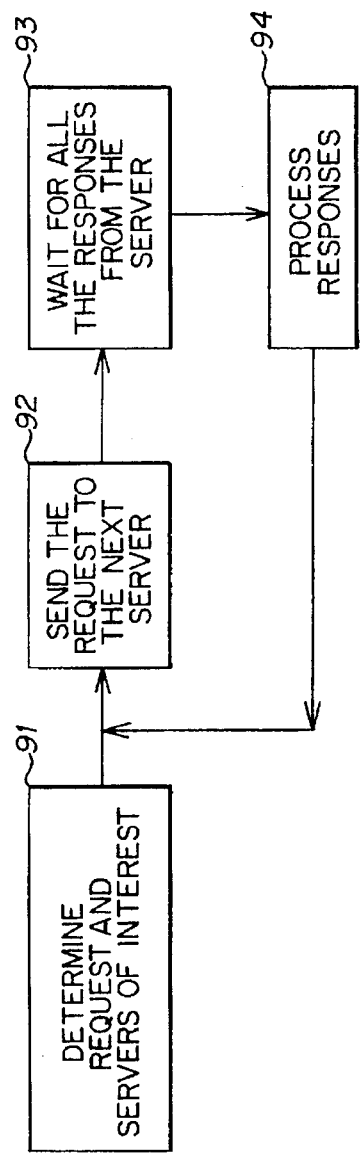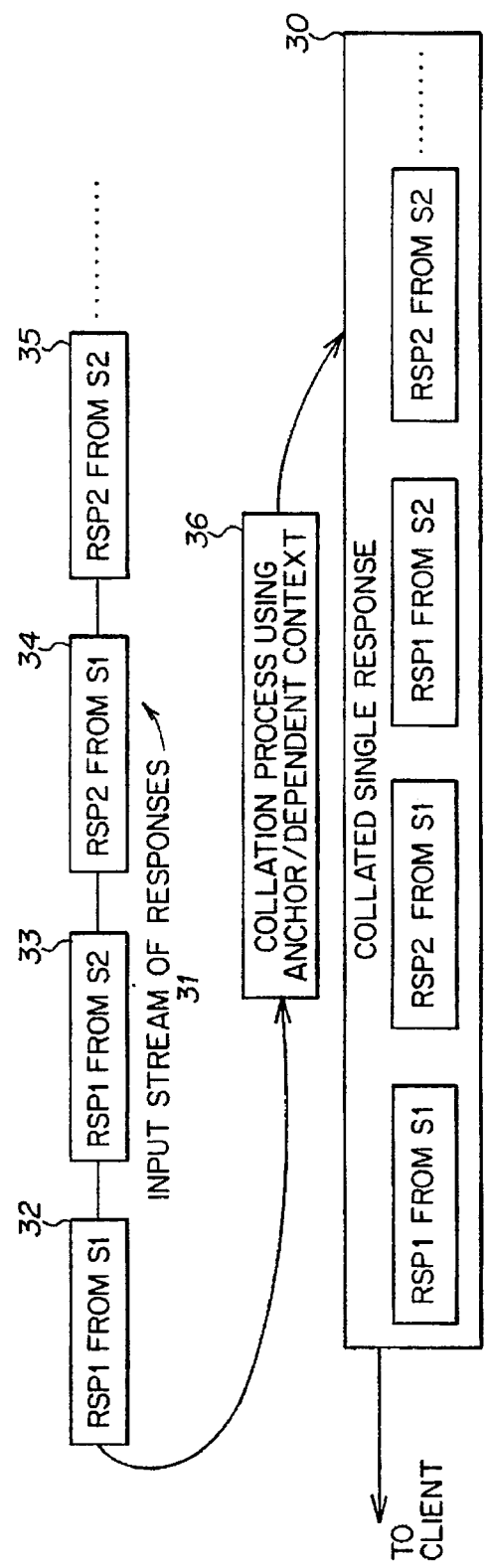

METHOD AND APPARATUS FOR MANAGING MULTIPLE SERVER REQUESTS AND COLLATING REPONSES

FIELD OF THE INVENTION

This invention relates generally to computer communications systems and more particularly to a mechanism and process for dispatching a request from a client to a number of servers, receiving responses from the servers, and returning a collated response to the client.

BACKGROUND OF THE INVENTION

In the "client-server" model of interaction in a distributed system, a program at one site sends a request to a program at another site and awaits a response. The requesting program is called a client; the program satisfying the request is called the server.

Communications networks allow clients and servers to exchange information by transmitting and receiving messages on the network. Currently, in order to obtain information from the servers, a client will send a remote request individually to each server from which the client requires information. Also, if the client does not know the address of the server of interest, it will use an external nameservice lookup which returns the server address. The client can then proceed with the individual request to the server.

This prior art technique is illustrated in FIG. 1. The process includes determining a request and the servers of interest (step 91), sending the request to a server (step 92), waiting for all of the responses from the server (step 93), and processing the responses (step 94). Each of steps 92–94 are repeated for each server.

This prior art technique does not provide for a single client request automatically translating into multiple (simultaneous) requests to multiple servers depending on the client's domains of interest. Furthermore, it requires that the client know the address of each server; the client must specify this address in each request. Further, the existing technique does not provide a collated response to multiple requests, even if the multiple requests are related. Also, there is also no overlap in time of the responses received. Instead, each request/response sequence is completed before a request is sent to the next server.

SUMMARY OF THE INVENTION

The present invention provides an apparatus and method for dispatching multiple requests from a client and for generating a collated response.

The method includes the steps of receiving from the client a request with a list of server domains of interest, mapping each domain to at least one server address, dispatching the request to each server address, receiving responses from each server, generating a collated response from the responses, and providing the client with the collated response.

In select embodiments: the collated response includes responses ordered according to the domains; and the collated response triggers a process in the client. The method can be used successfully for different protocols.

The apparatus of the invention may include a domain-to-server mapper which accesses an internal cache of domain/address mappings. The apparatus may further include a dispatcher for sending simultaneous requests to multiple servers and a receiver for receiving multiple responses simultaneously and storing the responses in a context table which includes an anchor context and a number of dependent contexts. A context is provided for each contacted server, and when all responses from a given server are received, it is transferred to the anchor context for providing a collated response to the client.

These and other advantages of the present invention will be more particularly described with respect to the following detailed description and figures.

BRIEF DESCRIPTION OF THE FIGURES

FIG. 1 is a block diagram of a prior art method for sequentially sending requests to servers and receiving responses;

FIG. 3 illustrates one method of collating a response in accordance with the present invention;

DETAILED DESCRIPTION

Figure 2:
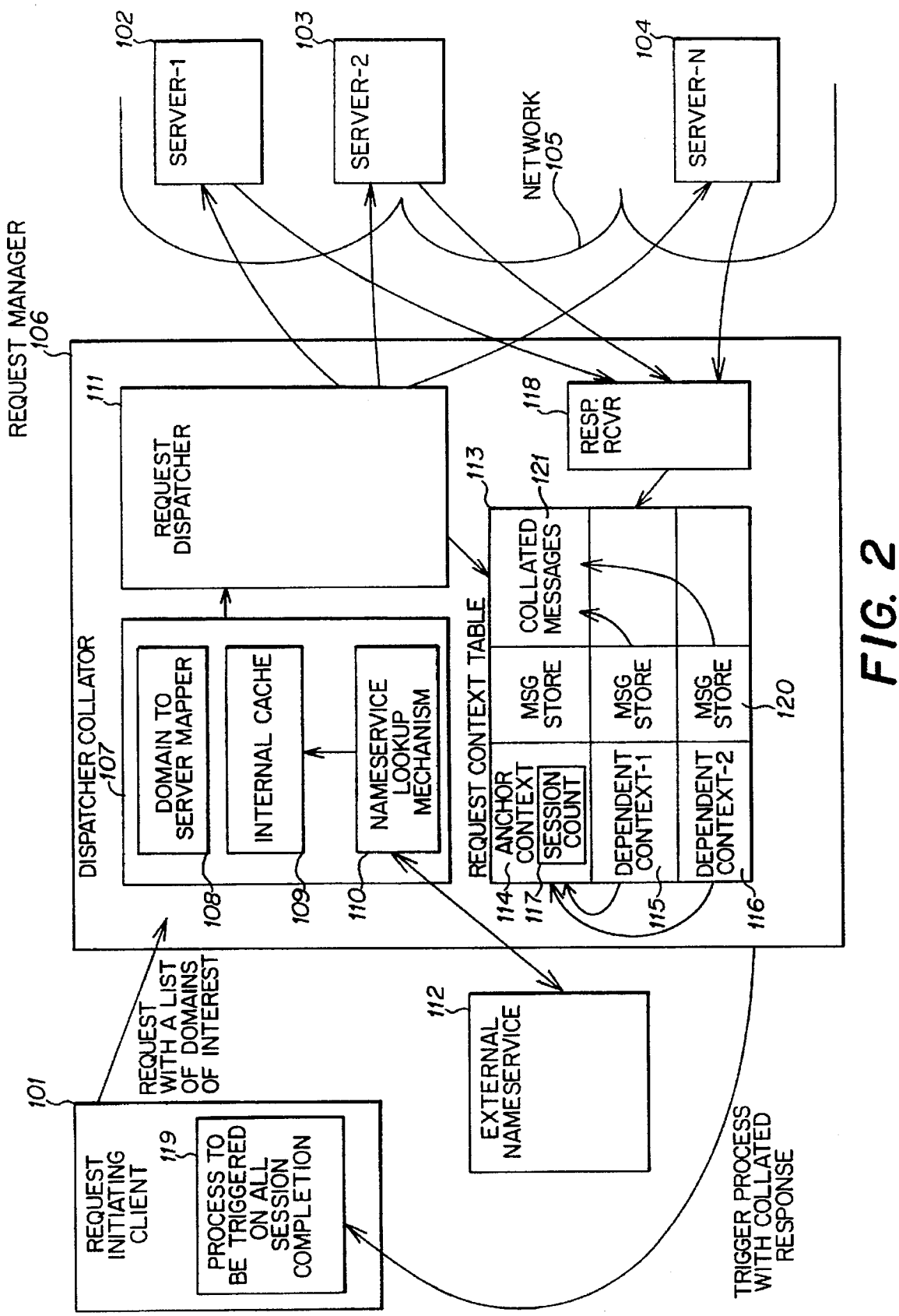
FIG. 2 is a block diagram illustrating one apparatus embodiment of the present invention.

FIG. 2 depicts one embodiment of the apparatus of the present invention. A client 101 may have one or several requests for information to be sent to one or several servers, for example server-1 (102), server-2 (103) . . . and server-N (104). These servers may reside on a single network 105, or several networks. Instead of specifying a server address as in the prior art, the client specifies a domain of interest and sends a request to a request manager 106. Within the request manager 106, a dispatcher collator 107 receives the request from the client. In this embodiment, the dispatcher collator includes a domain-to-server mapper 108, an internal cache 109 of server addresses, and a mechanism 110 for accessing an external nameservice process 112.

The domain-to-server mapper 108 determines which servers are associated with the domain of interest specified by the client 101. The client 101 may specify more than one domain of interest in a single request. The dispatcher collator 107 then passes the associated server addresses to the request dispatcher 111. In this embodiment, the mapper 108 checks the internal cache 109 for the server addresses, once the servers have been identified from the domain of interest. If the internal cache 109 does not contain the addresses for any of the servers within the domain of interest, the lookup mechanism 110 queries an external nameservice 112 to determine the same. In such an instance, the addresses requested from the external nameservice 112 will then be stored in the internal cache 109, so that next time the dispatcher collator 107 can access the addresses without invoking a nameservice query.

The scope of the invention is not limited by any particular form of the internal cache 109. In one embodiment, the cache 109 may be preset by the client 101 as an option. In such an instance, the client 101 may prespecify a list of domains of interest.

The request dispatcher 111 creates multiple request messages, normally one for each server. The request dispatcher 111 also creates a request context for each request and stores the same in a request context table 113. One of these contexts is designated the "anchor" context 114, and the remaining contexts are treated as "dependent" contexts 115, 116. Each of the dependent contexts 115, 116 has a reference to the anchor context 114. A context may be added to the request context table 113 and indexed by a unique number, such as an exchange identifier. In such an example, each request message sent to a server may also be tagged by the exchange identifier.

The request dispatcher 111 simultaneously sends a request message to each of the designated servers. In this embodiment, each time the request dispatcher 111 sends a request, a session count 117 within the anchor context 114 is incremented by one. Later, as the session with a particular server ends (indicated by either NO_DATA_FOUND, or NO_MORE_DATA or an error condition), the session count is decremented as described hereinafter.

Responses from the servers (102-104) may be received in any order, i.e. the responses may be asynchronous and interleaved. Normally, the order and amount of responses received from each server is completely unpredictable. This is because the order of receipt is influenced by such factors as the amount of relevant data stored by the server, the network distance between client and the server, etc. However, all of the responses received from any server are tagged by the same exchange identifier that was used for tagging the request that generated these responses. The response receiver 118 uses the exchange identifier associated with the response in order to identify the correct context. The response message received may then be stored in a message store area 120, shown in the request context table, where there is one message store area associated with each anchor context 114 and each dependent context 115, 116.

Normally, a server will set a no-more-data flag in a response when a session between the request manager 106 and a specific server is complete. When such session is complete, all of the responses from the message store of that context are transferred to the collated message store 121 in the anchor context. When each such transfer occurs, the session count is decremented by one, indicating that all responses associated with a particular context (i.e., coming from a single server) have been received. When the session count reaches a zero value, indicating that all responses from all contexts (both anchor and dependent) have been collated in the collated message store of the anchor context, the request manager 106 sends the collated message back to the client 101. In one embodiment, the responses within the collated message are placed in an order according to the server from which they were received. When the session count reaches zero, the dispatcher collator triggers a process 119 (pre-specified by the client at the initiation of the request) within the client 101 with a single collated response.

The server domain of interest can vary depending upon the application in which the response manager 106 is used. In general, a domain of interest is a sphere of control of a server, for example an entity or set of entities which the server controls, or which the server is responsible for. Examples of server domains include the set of network services that are managed by a single Cabletron Spectrum™ server (sold by Cabletron Systems, Inc., Rochester, N.H.), a database or databases managed by a single database server, a DCE (distributed computing environment), an X.500 standard cell, or a group of entities whose name/location service is provided by a cell-directory server.

A client may process a request, and then determine the domain of interest associated with the request. The domain of interest may be internally generated, may be received from an external device, or may be received from a user. As described above, the request manager processes these requests by mapping the domains of interest into a list of network server addresses, sending the request to each of the servers, and receiving and collating the received responses.

Thus, the invention enables a client to dispatch any information request to a desired set of servers by identifying only the request and the domains of interest. The invention is independent of the type of request or the communication protocol used between the client and servers. For example, an SNMP client may use this mechanism to send simultaneous requests to multiple SNMP servers (agents) and receive a single collated response; in the same way, a database client may send simultaneous SQL requests to multiple database servers and receive a single collated response. As used herein, "server" is broadly defined; the invention may be used for requesting responses from devices, such as other clients or other host computers; thus, as used herein, "server" includes such other devices.

Each server may send one or more responses for each request. Additionally, the request manager's session with each server may end in any order. In other words, multiple parallel sessions with multiple servers may continue, and the sessions do not have to end in the same order as the order in which the requests were sent. In one embodiment, the client has an option to indicate a specific process/action that needs to be triggered on receipt of all of the responses from all of the servers.

One process of collating a single response is illustrated in FIG. 3. An input stream of responses 31 for a particular request may be received in any order. As shown, the order of receipt in this example is "RSP 1 from S1" (32), "RSP 1 from S2" (33), "RSP 2 from S1" (34), and "RSP 2 from S2" (35). S1 indicates a first server to which a request was sent, and S2 indicates a second server to which a request was sent. However, it may be advantageous to the client to have the responses collated in a different order than received, e.g., by server. In this example, a collation process using the anchor/dependent context 36 provides a collated response 30 such that response 1 from S1 (32) and response 2 from S1 (34) are first provided in serial order, and response 1 from S2 (33) and response 2 from S2 (35) are next provided in serial order. The single collated response 30 is then provided to the client.

Figure 4:
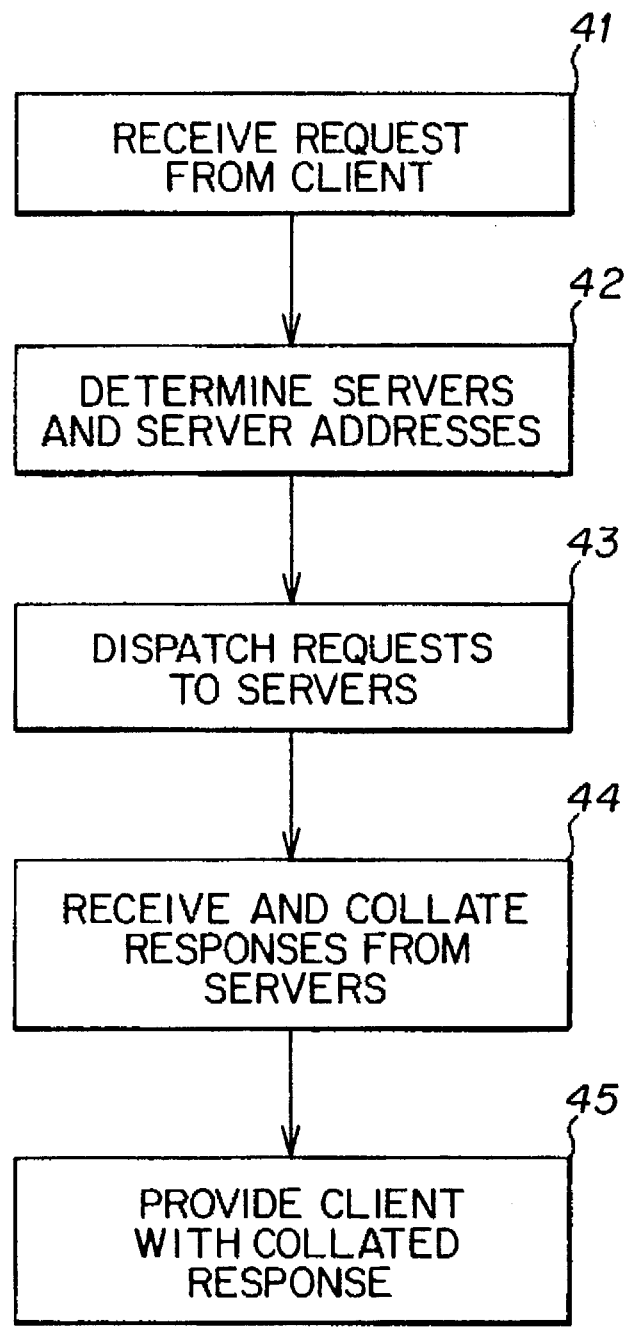
FIG. 4 is a flow chart of the overall method of the invention.

FIG. 4 illustrates generally the process steps in accordance with the present invention. In step 41, a request is received from a client. This request includes a domain of interest, or a number of domains of interests. Step 42 determines the servers from the domain or domains of interest, and also determines the address for each server. In step 43, the individual requests are dispatched to the servers, and in step 44 responses from the servers are received and collated. In step 45, the client is provided with a collated response. As indicated above, an internal cache may be used in step 42 to determine the server addresses, and a nameservice mechanism may also be used to determine the addresses. Furthermore, a request context table may be generated, which for each request, includes an anchor context and at least one dependent context. If the request is going to a single server, the anchor context and the dependent context are one and the same. In case the request is going to more than one server, one of the contexts is the anchor context and the rest are dependent contexts. The anchor context includes a session count, so that as responses are received and collated from a server, the session count can be decremented. This session count is initially incremented when each server is sent a request, as in step When the session count is decremented to zero (when all messages for all the requests are received), then the client may be provided with a collated response as in step 45. Alternatively, step 45 may trigger a process identified by a request within the client when the collator response is complete.

Figure 5:
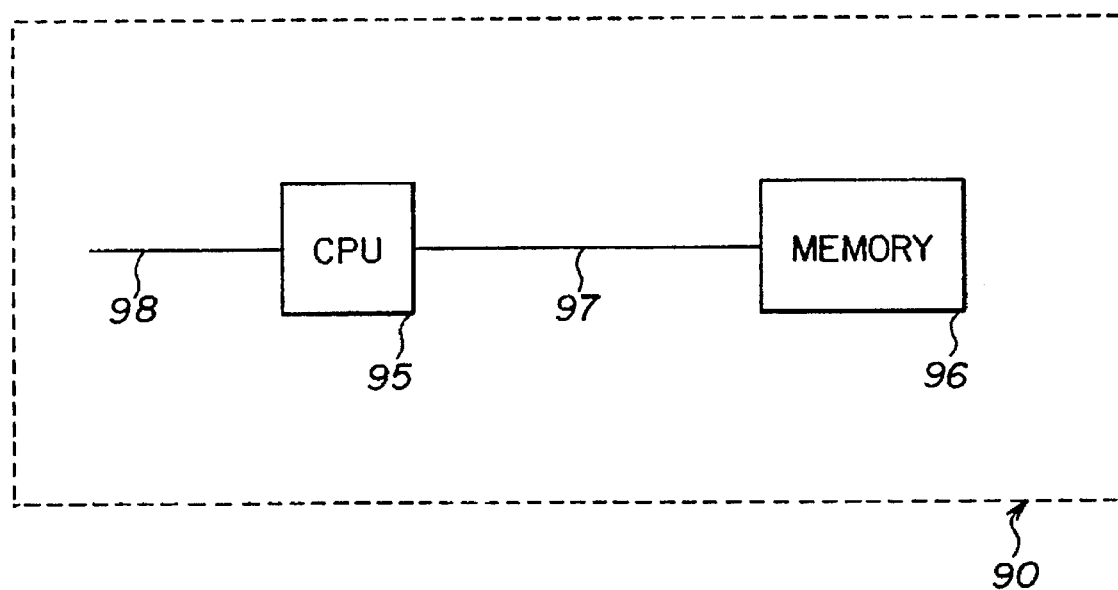
FIG. 5 shows a general purpose computer and memory for implementing the present invention.

Any of the above embodiments may be implemented in a general purpose computer 90 as shown in FIG. 5. This general purpose computer may include a computer processing unit (CPU) 95, memory 96, a processing bus 97 by which the CPU can access the memory, and an interface 98 by which the CPU can interface to other devices.

In alternative embodiments, the invention may be a general purpose computer apparatus 90 which performs the functions of any of the previous embodiments. Alternatively, the invention may be a memory 96, such as a floppy disk, compact disk, or hard drive, that contains a computer program or data structure, for providing to a general purpose computer instructions and data for carrying out the functions of the previous embodiments.

Having thus described several particular embodiments of the invention, various modifications and improvements will readily occur to those skilled in the art and are intended to be within the scope of this invention. Accordingly, the foregoing description is by way of example only, and not intended to be limiting.

What is claimed is:

1. In a network including a plurality of servers and clients, a method for receiving a request from a client and providing a collated response comprising the steps of:

receiving a request from a client including a domain of interest, the domain of interest having a set of associated servers;

mapping the domain of interest to a corresponding server address for each of the associated servers;

dispatching the request simultaneously to each of the associated servers;

receiving at least one response from the associated servers;

generating a collated response from the at least one response; and providing the client with the collated response.

2. The method of claim 1, wherein the mapping step includes:

determining from a cache the server addresses.

3. The method of claim 1, wherein the mapping step includes;

determining from a nameservice the server addresses.

4. The method of claim 1, further including:

determining at least one domain of interest and associated servers.

5. The method of claim 1, wherein the set includes multiple associated servers.

6. The method of claim 5, wherein the generating step includes:

generating an anchor context corresponding to one of the associated servers, the anchor context including a message store area for storing the responses from the one associate server;

generating a dependent context, coupled to the anchor context, for each of the other associated servers, each dependent context including a message store area for storing the responses from the other associated server.

7. The method of claim 5, further including:

initializing a session counter to zero;

incrementing the session counter by one for each request sent to one of the associated servers;

decrementing the session counter by one for each completion of a session with one of the associated servers when all responses are received from that server; and providing the collated response when the session counter has been decremented to zero.

8. The method of claim 5, wherein the generating step includes ordering of the at least one response according to the associated servers.

9. The method of claim 1, further including:

maintaining a cache of corresponding server addresses and associated servers for at least one domain of interest.

10. The method of claim 1, wherein the step of providing the collated response triggers a process within the client.

11. Apparatus for receiving a request from a client and providing a collated response in a network including a plurality of servers and clients, the apparatus comprising:

a dispatcher collator, having an input that receives a request from a client, the request including a domain of interest, the dispatcher collator having an output that provides at least one address corresponding to at least one server, the at least one server corresponding to the domain of interest;

a request dispatcher, having an input coupled to the output of the dispatcher collator, and an output that includes at least one request that is sent to the at least one server; and a response receiver, having an input that receives at least one response from the at least one server, in response to the at least one request, wherein the response receiver provides as an output to the client a collated response, wherein the collated response includes each at least one response.

12. The apparatus of claim 11, wherein the dispatch collator includes:

a domain-to-server mapper, having an input that receives the domain of interest, and an output that determines the at least one server that corresponds to the domain of interest;

an internal cache, having an input coupled to the output of the domain-to-server mapper, and an output that provides an address for each at least one server having an address within the internal cache.

13. The apparatus of claim 12, wherein the internal cache includes prespecified server addresses, corresponding to a domain of interest prespecified by the client.

14. The apparatus of claim 12, further including:

a nameservice lookup mechanism, having an input coupled to the output of the domain-to-server mapper, and an output that provides an address for each at least one server not having an address within the internal cache, wherein the nameservice lookup mechanism further has a second output that queries an external nameservice, and a second input receiving a response from the external nameservice.

15. The apparatus of claim 11, further including a request table, coupled to the response receiver and the request dispatcher, that includes:

an anchor context corresponding a first of the at least one server, including a message store area to store responses from the first server;

a dependent context, coupled to the anchor context, including a message store area to store responses from a second of the at least one server; and a response collator for processing the responses and generating the collated response.

16. The apparatus of claim 15, wherein the request table further includes a session counter that is incremented by one for each request sent to the at least one server.

17. The apparatus of claim 11, wherein the response receiver collates the at least one response ordered according to the at least one server.

18. An electronic storage media, containing data representing a computer program for providing instructions to a general purpose computer for receiving a request from a client on a network and for providing a collated response to the client, the electronic storage media comprising:

means for providing instructions for receiving the request, the request including a domain of interest and an information request;

means for providing instructions for mapping the domain of interest to at least one address, the at least one address corresponding to at least one server;

means for providing instructions for dispatching at least one request, corresponding to the at least one address, to each of the at least one server;

means for providing instructions for receiving at least one response from the at least one server;

means for providing instructions for generating a collated response from the at least one response; and means for providing instructions for providing the client with the collated response.

* * * * *

UNITED STATES PATENT AND TRADEMARK OFFICE
CERTIFICATE OF CORRECTION

PATENT NO. : 5,649,103
DATED : July 15, 1997
INVENTOR(S) : Datta et al.

It is certified that error appears in the above-identified patent and that said Letters Patent is hereby corrected as shown below:

Col. 4, line 64 - after "step" insert -- 43. --

Signed and Sealed this

Twenty-fifth Day of November, 1997

Attest:

Attesting Officer

BRUCE LEHMAN

Commissioner of Patents and Trademarks